(12) United States Patent
Dong et al.

(10) Patent No.: US 12,360,927 B2
(45) Date of Patent: *Jul. 15, 2025

(54) DUPLICATED REGISTERS IN CHIPLET PROCESSING UNITS

(71) Applicants: Advanced Micro Devices, Inc., Santa Clara, CA (US); ATI Technologies ULC, Markham (CA)

(72) Inventors: Haikun Dong, Beijing (CN); Kostantinos Danny Christidis, Toronto (CA); Ling-Ling Wang, New Taipei (TW); Minhua Wu, Shanghai (CN); Gaojian Cong, Shanghai (CN); Rui Wang, Shanghai (CN)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/620,731

(22) Filed: Mar. 28, 2024

(65) Prior Publication Data

US 2024/0354268 A1    Oct. 24, 2024

Related U.S. Application Data

(63) Continuation of application No. 17/499,494, filed on Oct. 12, 2021, now Pat. No. 11,947,473.

(51) Int. Cl.
*G06F 13/16* (2006.01)
*G06F 3/06* (2006.01)

(52) U.S. Cl.
CPC ........ *G06F 13/1673* (2013.01); *G06F 3/0604* (2013.01); *G06F 3/0659* (2013.01); *G06F 3/0688* (2013.01)

(58) Field of Classification Search
None
See application file for complete search history.

(56) References Cited

U.S. PATENT DOCUMENTS 4,434,461 A    2/1984 Puhl
6,233,599 B1    5/2001 Nation et al.
(Continued)

OTHER PUBLICATIONS

International Search Report and Written Opinion in International Application No. PCT/US2022/077848, mailed Feb. 2, 2023, 11 pages.
(Continued)

*Primary Examiner* — Scott C Sun
(74) *Attorney, Agent, or Firm* — Kowert, Hood, Munyon, Rankin & Goetzel, P.C.; Rory D. Rankin

(57) ABSTRACT

Systems, apparatuses, and methods for implementing duplicated registers for access by initiators across multiple semiconductor dies are disclosed. A system includes multiple initiators on multiple semiconductor dies of a chiplet processor. One of the semiconductor dies is the master die, and this master die has copies of registers which can be accessed by the multiple initiators on the multiple semiconductor dies. When a given initiator on a given secondary die generates a register access, the register access is routed to the master die and a particular duplicate copy of the register maintained for the given secondary die. From the point of view of software, the multiple semiconductor dies appear as a single die, and the multiple initiators appear as a single initiator. Multiple types of registers can be maintained by the master die, with a flush register being one of the register types.

20 Claims, 11 Drawing Sheets

(56) References Cited

U.S. PATENT DOCUMENTS

| | | | |
|---|---|---|---|
| 11,016,929 | B2 | 5/2021 | Ray et al. |
| 2008/0313589 | A1 | 12/2008 | Maixner et al. |
| 2015/0039860 | A1 | 2/2015 | Sundar et al. |
| 2019/0042729 | A1 | 2/2019 | Desai et al. |
| 2021/0263853 | A1 | 8/2021 | Waters et al. |
| 2021/0357222 | A1* | 11/2021 | Nair ............... G06F 9/3854 |
| 2022/0019934 | A1 | 1/2022 | Balaji |

OTHER PUBLICATIONS

Islam, et al., "Improving Node-Level MapReduce Performance using Processing-in-Memory Technologies", European Conference on Parallel Processing, 12 pages, https://csrl.cse.unt.edu/kavi/Research/UCHPC-2014.pdf. [Retrieved Mar. 29, 2021].

Nyasulu, Peter M., "System Design for a Computational-RAM Login-In-Memory Parallel Processing Machine", PhD Thesis, May 1999, 196 pages, https://central.bac-lac.gc.ca/.item?id=NQ42803&op=pdf&app=Library&oclc_number=1006659158. [Retrieved Mar. 29, 2021].

Pugsley, et al. "Analyzing the impact of 3D-stacked Memory+Logic Devices on MapReduce Workloads", 2014 IEEE International Symposium on Performance Analysis of Systems and Software (ISPASS), Mar. 2014, pp. 190-200, https://www.researchgate.net/publication/269302127_NDC_Analyzing_the_impact_of_3D-stacked_memorylogic_devices_on_MapReduce_workloads/link/5c88489fa6fdcc38174f961e/download. [Retrieved Mar. 29, 2021].

Yang et al., "A Processing-in-Memory Architecture Programming Paradigm for Wireless Internet-of-Things Applications", Sensors Journal, Jan. 2019, 23 pages, https://pdfs.semanticscholar.org/81cd/bda211fd479c23de2213fb610b484548cb01.pdf?_ga=2.58956461.1037489400.1617057589-1017129252.1617057589. [Retrieved Mar. 29, 2021].

Alexander, Esther C., "MPC8240 and MPC8245: Comparison and Compatibility", Freescale Semiconductor, Inc., Document No. AN2128, Oct. 2006, 28 pages, Revision 5, https://www.nxp.com/docs/en/application-note/AN2128.pdf. [Retrieved Jun. 9, 2021].

"Intel® Pentium® 4 Processor-Based System Integration Overview for Processors" Intel, Dec. 21, 2015, 7 pages, https://www.intel.co.uk/content/www/uk/en/support/processors/desktop-processors/000006865.html. [Retrieved Jun. 9, 2021].

Kalamatianos et al., U.S. Appl. No. 17/139,496, entitled "Reusing Remote Registers in Processing in Memory", filed Dec. 31, 2020, 28 pages.

* cited by examiner

| Initiator ID 810 | Register Copy ID 820 |
|---|---|
| 001 | 520B |
| ... | ... |
| 111 | 520N |

905
Receive, by a Control Unit of a Master Semiconductor Die of a Multi-Die Chiplet Processor, a Register Access Targeting a Given Register from a Given Initiator

910
Retrieve an Initiator ID from the Register Access

915
Identify a Copy of the Given Register to Access based on the Retrieved Initiator ID

920
Perform an Access to the Identified Copy of the Given Register

925
Perform One or More Actions as a Result of the Access to the Given Register

*FIG. 9*

DUPLICATED REGISTERS IN CHIPLET PROCESSING UNITS

PRIORITY DATA

This application is a continuation of U.S. patent application Ser. No. 17/499,494, titled "Duplicated Registers in Chiplet Processing Units", filed Oct. 12, 2021, which is hereby incorporated by reference in its entirety as though fully and completely set forth herein.

BACKGROUND

Description of the Related Art

Computing devices such as mobile phones, tablets, personal digital assistants (PDAs), digital cameras, portable players, gaming devices, laptops, and other devices requires the integration of more performance and features into increasingly smaller spaces. As a result, the density of processor dies and the number of dies integrated within a single integrated circuit (IC) package have increased. Some conventional multi-chip modules include two or more semiconductor chips mounted side-by-side on a carrier substrate or in some cases on an interposer (so-called "2.5D") that is, in-turn, mounted on a carrier substrate.

BRIEF DESCRIPTION OF THE DRAWINGS

The advantages of the methods and mechanisms described herein may be better understood by referring to the following description in conjunction with the accompanying drawings, in which:

FIG. 8 is a diagram of one implementation of a register copy mapping table.

FIG. 9 is a generalized flow diagram illustrating one implementation of a method for determining which copy of a register to access based on an initiator index.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing duplicated registers for access by initiators across multiple semiconductor dies are disclosed herein. In one implementation, a system includes multiple initiators on multiple semiconductor dies. In this implementation, one of the semiconductor dies is the master die, and this master die maintains multiple copies of each register, with each copy accessible by initiators on a corresponding semiconductor die. In other words, each semiconductor die has its own copy of a given register to access. For example, in a system with a four-die chiplet graphics processing unit (GPU), the master die will maintain four separate copies of the given register, with one copy per die. This allows multiple initiators on multiple dies to access the given register without conflicting with each other. From the point of view of a particular initiator on a secondary die, only this initiator has access to the given register. From the point of view of software, the multiple semiconductor dies appear as a single die, and the multiple initiators appear as a single initiator.

The initiators can be compute units, command processors, direct memory access (DMA) engines, or other types of hardware or software agents. When a given initiator on a given secondary die generates a register access, the access is routed to the master die and the access is performed to a copy of the register corresponding to the given secondary die. Multiple types of registers can be maintained by the master die, with a flush register being one of the register types. When a write is performed to any of the copies of the flush register, outstanding memory transactions are flushed (i.e., discarded without being performed). The master die can also maintain copies of other types of registers.

Figure 1:
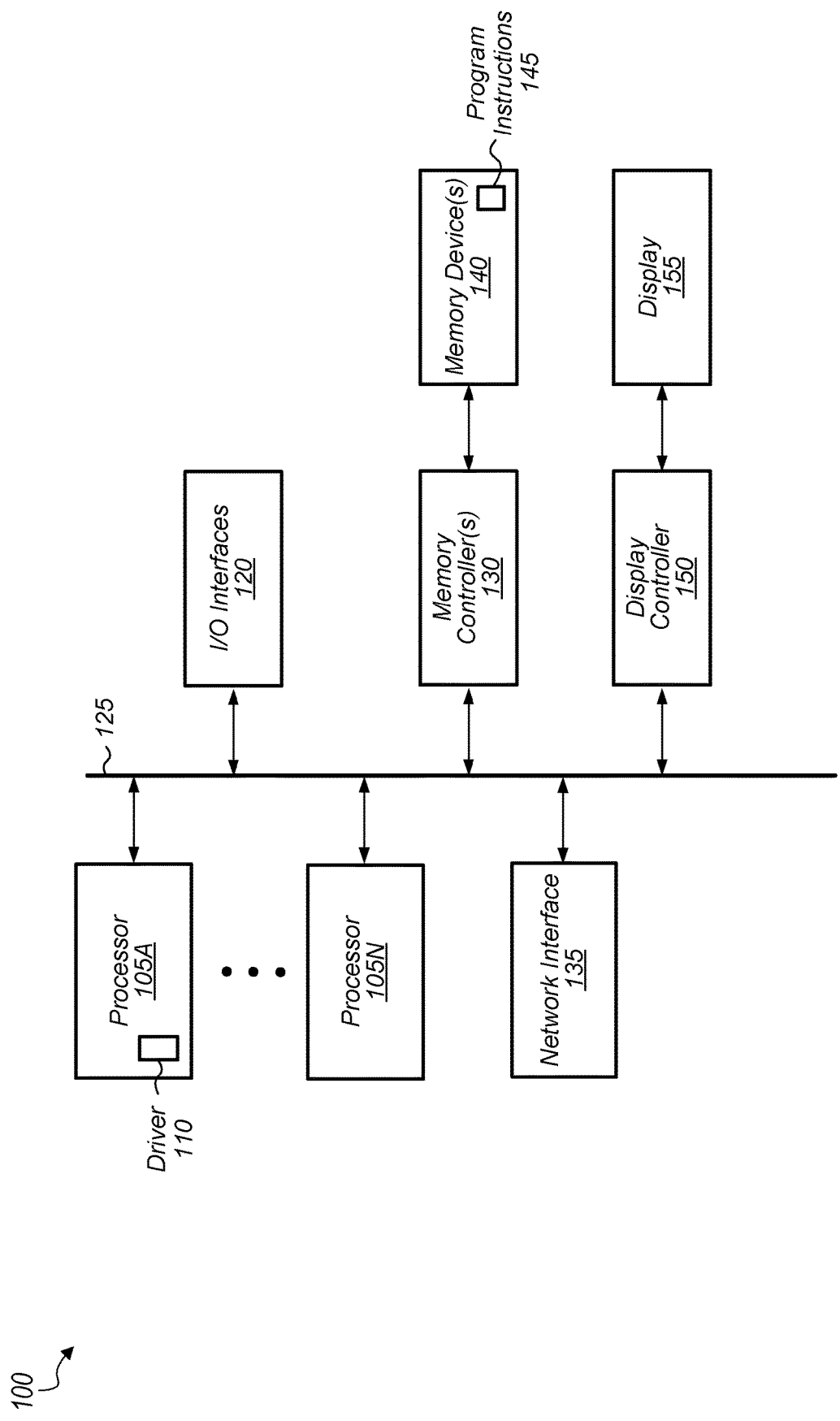
FIG. 1 is a block diagram of one implementation of a computing system.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In this implementation, processor 105A executes a driver 110 (e.g., graphics driver) for communicating with and/or controlling the operation of one or more of the other processors in system 100. It is noted that depending on the implementation, driver 110 can be implemented using any suitable combination of hardware, software, and/or firmware. In one implementation, processor 105N is a data parallel processor with a highly parallel architecture, such as a chiplet graphics processing unit (GPU) which processes data, executes parallel processing workloads, renders pixels for display controller 150 to drive to display 155, and/or executes other workloads.

A chiplet GPU is a complex integrated circuit that performs graphics-processing tasks across multiple semiconductor dies. GPUs can execute graphics-processing tasks required by an end-user application, such as a video-game application. GPUs are also increasingly being used to perform other tasks which are unrelated to graphics. Other data parallel processors that can be included in system 100 include digital signal processors (DSPs), field programmable gate arrays (FPGAs), application specific integrated circuits (ASICs), and so forth. In some implementations, processors 105A-N include multiple data parallel processors.

Memory controller(s) 130 are representative of any number and type of memory controllers accessible by processors 105A-N. While memory controller(s) 130 are shown as being separate from processors 105A-N, it should be understood that this merely represents one possible implementation. In other implementations, a memory controller 130 can be embedded within one or more of processors 105A-N and/or a memory controller 130 can be located on the same semiconductor die as one or more of processors 105A-N. Memory controller(s) 130 are coupled to any number and type of memory devices(s) 140.

Memory device(s) 140 are representative of any number and type of devices containing memory and/or storage elements. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others. Memory device(s) 140 store program instructions 145, which can include a first set of program instructions for an application, a second set of program instructions for a driver component, and so on. Alternatively, program instructions 145, or a portion thereof, can be stored in a memory or cache device local to processor 105A and/or processor 105N.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 is able to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
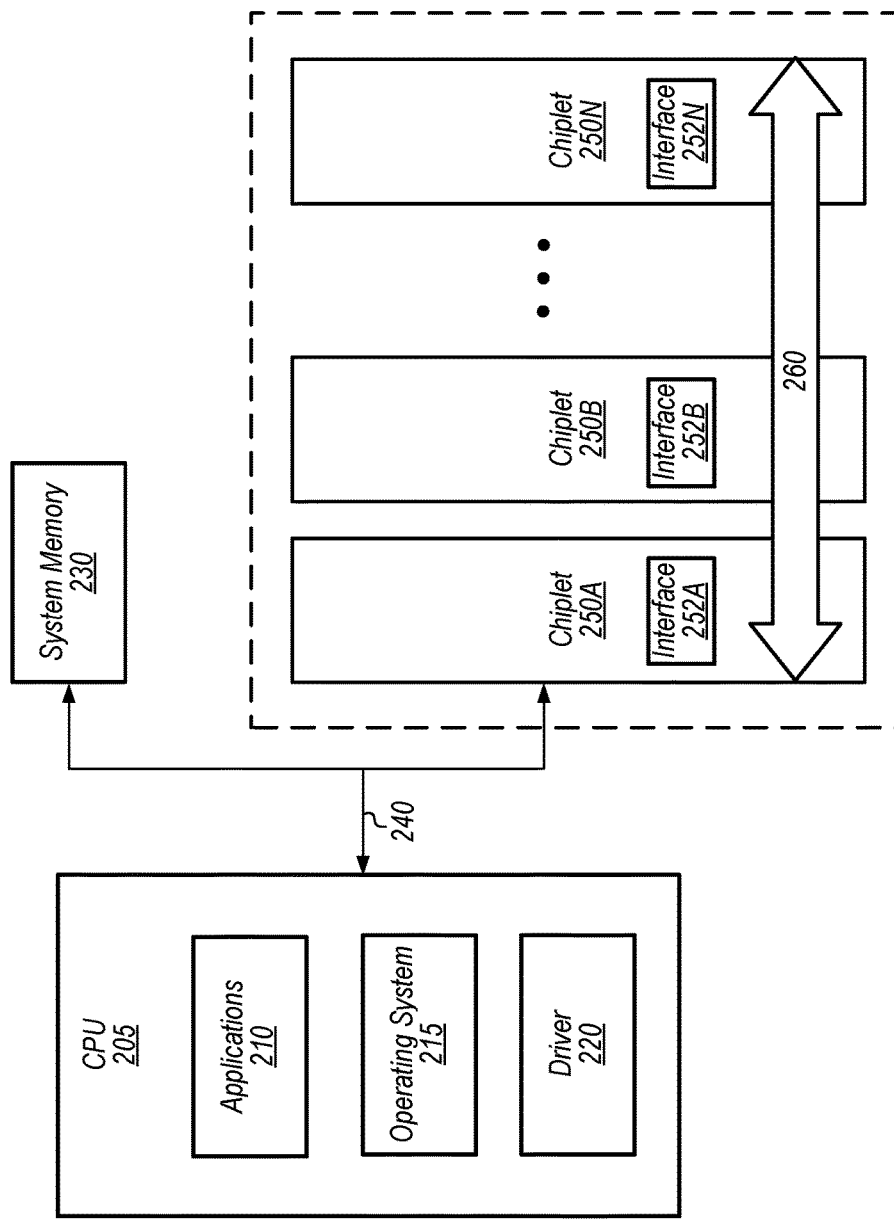
FIG. 2 is a block diagram of a processing system employing GPU chiplets in accordance with some implementations.

Turning now to FIG. 2, a block diagram illustrating a processing system 200 employing GPU chiplets in accordance with some implementations is shown. In the depicted example, the system 200 includes a central processing unit (CPU) 205 for executing instructions and an array of one or more GPU chiplets, such as GPU chiplets 250A, 250B, and through 250N (collectively, GPU chiplets 250). In various implementations, and as used herein, the term "chiplet" refers to any device including, but not limited to, the following characteristics: 1) a chiplet includes an active silicon die containing part of the computational logic used to solve a full problem (i.e., the computational workload is distributed across multiples of these active silicon dies); 2) chiplets are packaged together as a monolithic unit on the same substrate; and 3) the programming model preserves the concept that these separate computational dies are a single monolithic unit (i.e., each chiplet is not exposed as a separate device to an application that uses the chiplets for processing computational workloads).

In various implementations, the CPU 205 is connected via a bus 240 to a system memory 230, such as a dynamic random access memory (DRAM). In various implementations, the system memory 230 can also be implemented using other types of memory including static random access memory (SRAM), nonvolatile RAM, and the like. In the illustrated implementation, the CPU 205 communicates with the system memory 230 and also the GPU chiplets 250 over bus 240 that is implemented as a peripheral component interconnect (PCI) bus, PCI-E bus, or other type of bus. However, some implementations of the system 200 include the GPU chiplets 250 communicating with the CPU 205 over a direct connection or via other buses, bridges, switches, routers, and the like.

As illustrated, the CPU 205 includes a number of processes, such as one or more application(s) 210 to generate graphic commands and a user mode driver 220 (or other drivers, such as a kernel mode driver). In various implementations, the one or more applications 210 include applications that utilize the functionality of the GPU chiplets 250, such as applications that generate work in the system 200 or an operating system (OS) 215. An application 210 may include one or more graphics instructions that instruct the GPU chiplets 250 to render a graphical user interface (GUI) and/or a graphics scene. For example, the graphics instructions may include instructions that define a set of one or more graphics primitives to be rendered by the GPU chiplets 250.

In some implementations, the application 210 utilizes a graphics application programming interface (API) to invoke a user mode driver 220 (or a similar GPU driver). In one implementation, user mode driver 220 issues one or more commands to the array of one or more GPU chiplets for rendering one or more graphics primitives into displayable graphics images. Based on the graphics instructions issued by application 210 to the user mode driver 220, the user mode driver 220 formulates one or more graphics commands that specify one or more operations for GPU chiplets to perform for rendering graphics. In some implementations, the user mode driver 220 is a part of the application 210 running on the CPU 205. For example, the user mode driver 220 may be part of a gaming application running on the CPU 205. Similarly, a kernel mode driver (not shown) may be part of OS 215 running on the CPU 205.

In the depicted implementation of FIG. 2, a communication link 260 (e.g., crosslink 260) connects the GPU chiplets 250 (i.e., GPU chiplets 250A through 250N) to each other. In sun an implementation, each of the chiplets (250) includes an interface (252A to 252N) configured to allow the chiplet to communicate via the link 260. It is noted that the number of GPU chiplets in the chiplet array is a matter of design choice and may vary from implementation to implementation. In various implementations, the link 260 is a bus, an interconnect chip such as a high density link (HDCL) die interposer, or other inter-chiplet communications mechanism.

Figure 3:
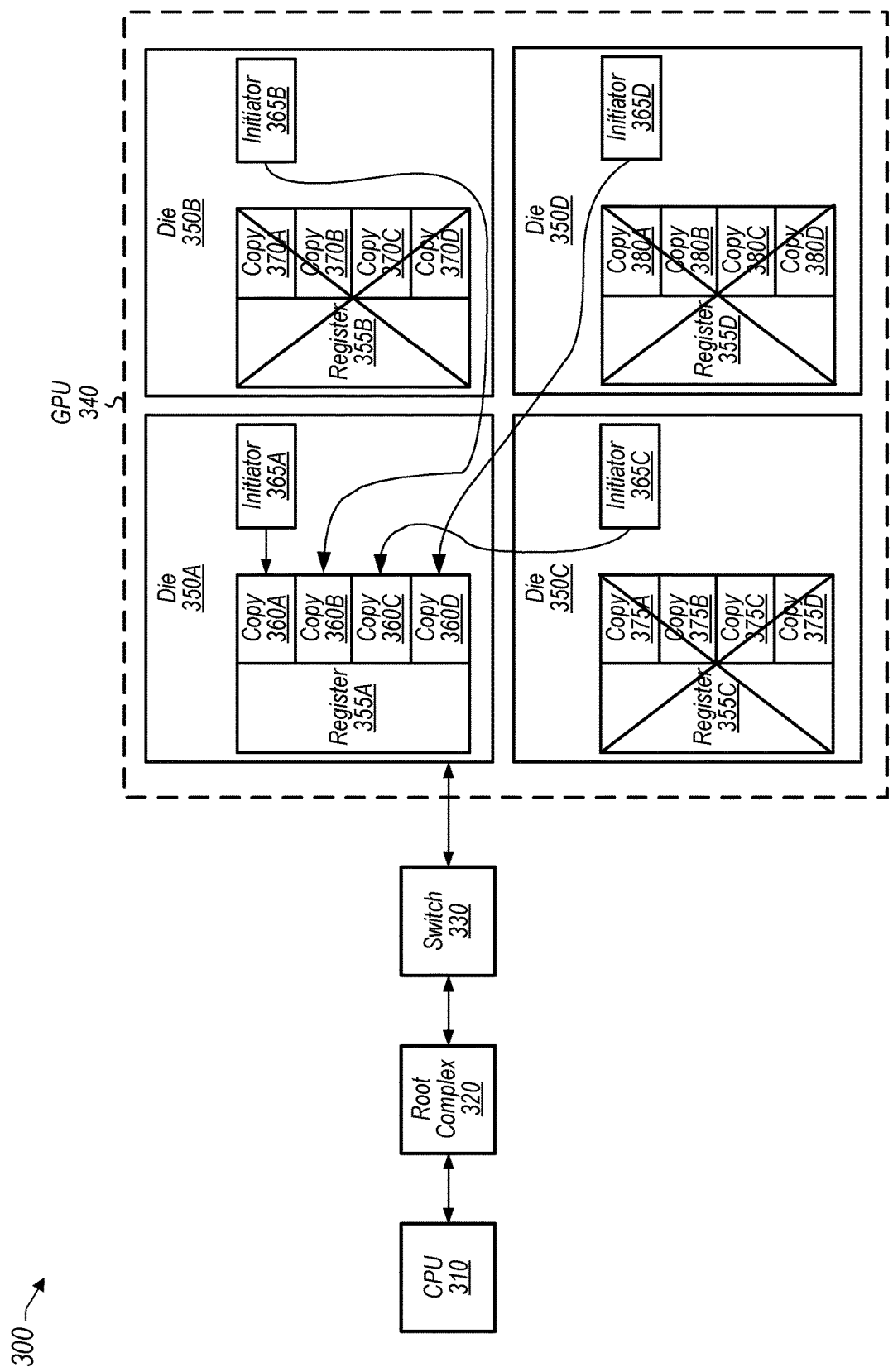
FIG. 3 is a block diagram of another implementation of a computing system.

Referring now to FIG. 3, a block diagram of another implementation of a computing system 300 is shown. As shown in FIG. 3, computing system 300 includes central processing unit (CPU) 310, root complex 320, switch 330, and graphics processing unit (GPU) 340. In one implementation, GPU 340 is a chiplet GPU that includes dies 350A-D which are representative of any number of semiconductor dies. It is noted that computing system 300 can include any number of other components (e.g., voltage regulator(s), memory device(s), network interface(s), peripheral device(s)) which are not shown to avoid obscuring the figure. Computing system 300 can be any of the previously listed devices or systems, such as a computer, laptop, server, supercomputer, mobile device, or otherwise. Computing system 300 may also be a subsystem which is incorporated into other devices or systems. Any of various other types of devices, systems, or subsystems are possible and are contemplated.

CPU 310 is representative of any type of CPU or other types of processor. Depending on the implementation, CPU 310 can include multiple cores or a single core. In one implementation, CPU 310 executes the control software (e.g., the operating system (OS)) of system 300. The operating system controls the operation of system 300 to achieve the desired functionality of the system. The operating system may include and/or interact with various software programs/components such as drivers, control software, and so on. Root complex 320 connects switch 330 to CPU 310, as well as any other number and type of other components which are not shown in FIG. 3 to avoid obscuring the figure. In one implementation, switch 330 is a peripheral component interconnect express (PCIE) switch. In other implementations, switch 330 is any of various other types of switches.

As shown in FIG. 3, chiplet GPU 340 includes four dies 350A-D. In other implementation, chiplet GPU 340 can include other numbers (e.g., 8, 10, 16, 25, 32) of dies. As shown, each die 350A-D includes an initiator 365A-D, respectively, which is representative of any number and type of agents, components, or other units that generate register accesses targeting register 355A. While each die 350A-D is shown as including one initiator, it should be understood that this is intended merely for illustrative purposes. In other implementations, each die 350A-D can include other numbers of initiators. Also, it should be understood that different dies can have different numbers of initiators. For example, a first die could have one initiator, a second die could have two initiators, a third die could have three initiators, and so on.

While each die 350A-D is shown as having a corresponding register 355A-D, only die 350A has an enabled register 355A in one implementation. In some cases, dies 350B-D also have registers 355B-D, respectively, but these registers are disabled. For example, each die 350A-D is identical in one implementation, with only one of the dies having an enabled register and copies of the register with the other dies having disabled registers and disabled copies. The enabled register and copies on master die 350A are intended to service accesses from all dies 350A-D.

Register accesses to register 355A from initiators 365B-D are routed from dies 350B-D to copies 360B-D, respectively. In other words, there is a copy 360B-D for each die 350B-D, respectively, to prevent register accesses from different dies from conflicting with each other. In one implementation, when a register access is generated by an initiator on a secondary die (e.g., dies 350B-D), the register access traverses a link (e.g., communication link 260 of FIG. 2) to the master die 350A. In one implementation, a die ID is added to the register access to identify where the register access originated from. This die ID allows die 350A to route the register access to the appropriate copy 360B-D.

In one implementation, register 355A is a flush register that controls when memory transactions are flushed. For example, in this implementation, when an initiator writes to register 355A, this causes all outstanding memory transactions to be flushed from the memory subsystem (e.g., system memory 230 of FIG. 2). If initiator 365B generates a write access to register 355A, this write access will be tagged with a die ID for die 350B, and then the write access, with the die ID for die 350B, will be sent to die 350A. The write access will be performed to copy 360B since the access includes the die ID for die 350B. If at a later point in time initiator 365C generates a write access targeting register 355A, this write access will be tagged with a die ID for die 350C and be sent to die 350A. When die 350A receives this write access, a write will be performed to copy 360C. It is noted that the write accesses of initiator 365B and 365C will both include the same register address of register 355A. Die 350A will differentiate these write accesses based on their corresponding die IDs. It is noted that in other implementations, register 355A can be other types of registers besides a flush register.

Figure 4:
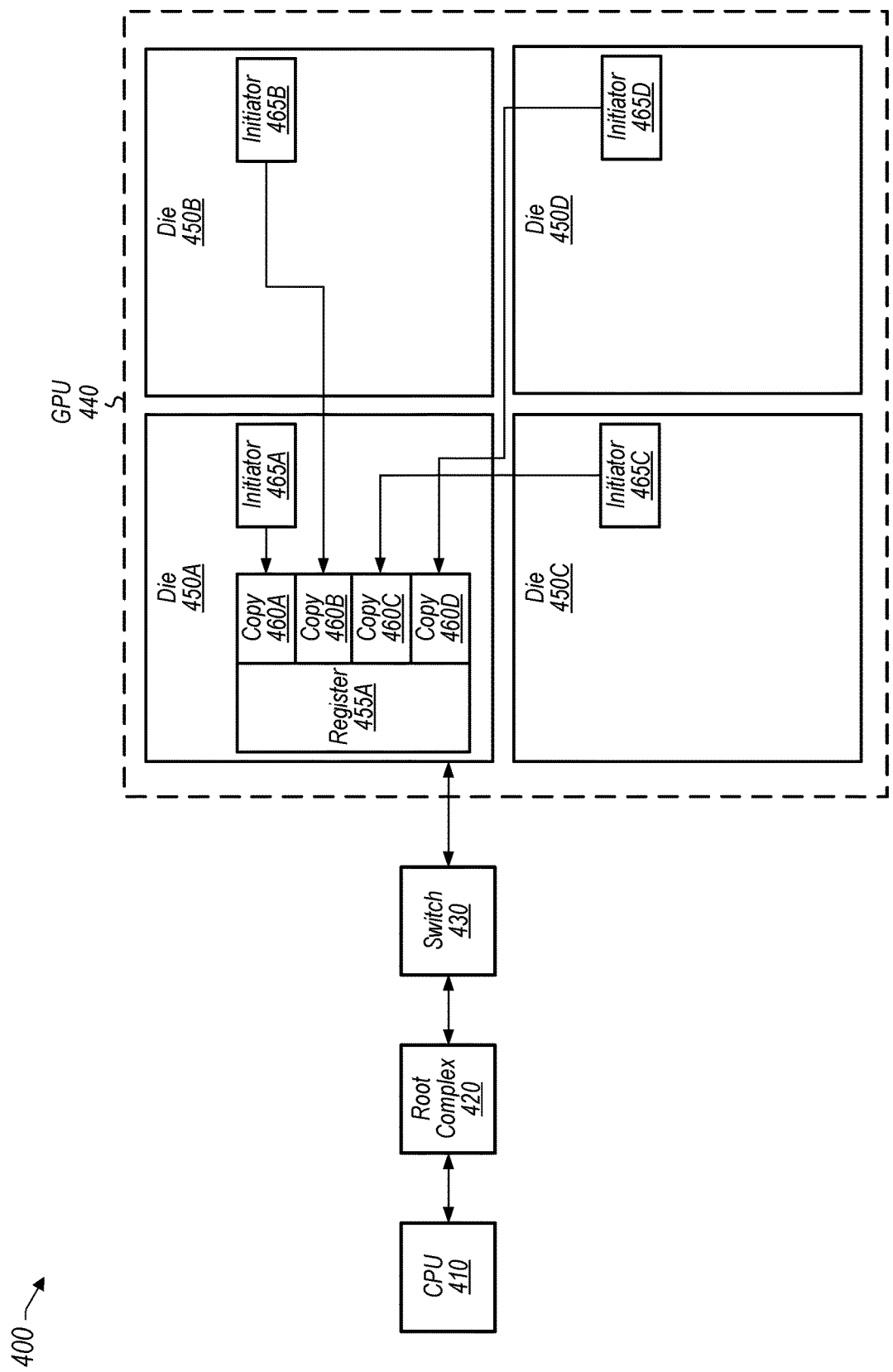
FIG. 4 is a block diagram of another implementation of a computing system with a chiplet GPU.

Turning now to FIG. 4, a block diagram of another implementation of a computing system 400 with a chiplet GPU 440 is shown. Chiplet GPU 440 is similar to chiplet GPU 340 (of FIG. 3), in that chiplet GPU 440 includes four dies 450A-D, with die 450A the master die. It should be understood that dies 450A-D are representative of any number of dies, and that the example of four dies 450A-D is merely indicative of one particular implementation. Other implementations can have other numbers of dies within a chiplet GPU. Die 450A includes a connection to CPU 410 through switch 430 and root complex 420. It is noted that system 400 can include any number and type of other components which are not shown to avoid obscuring the figure.

While chiplet GPU 340 has homogeneous dies 350A-D, chiplet GPU 440 has heterogeneous dies 450A-D. Accordingly, die 450A has register 455A and register copies 460A-D while dies 450B-D do not have a corresponding register and register copies. Similar to chiplet GPU 340, initiator 465A on master die 450A is coupled to copy 460A, initiator 465B on secondary die 450B is coupled to copy 460B, initiator 465C on secondary die 450C is coupled to copy 460C, and initiator 465D on secondary die 450D is coupled to copy 460D. The functionality of master die 450A is similar to that described for master die 350A of chiplet GPU 340.

Figure 5:
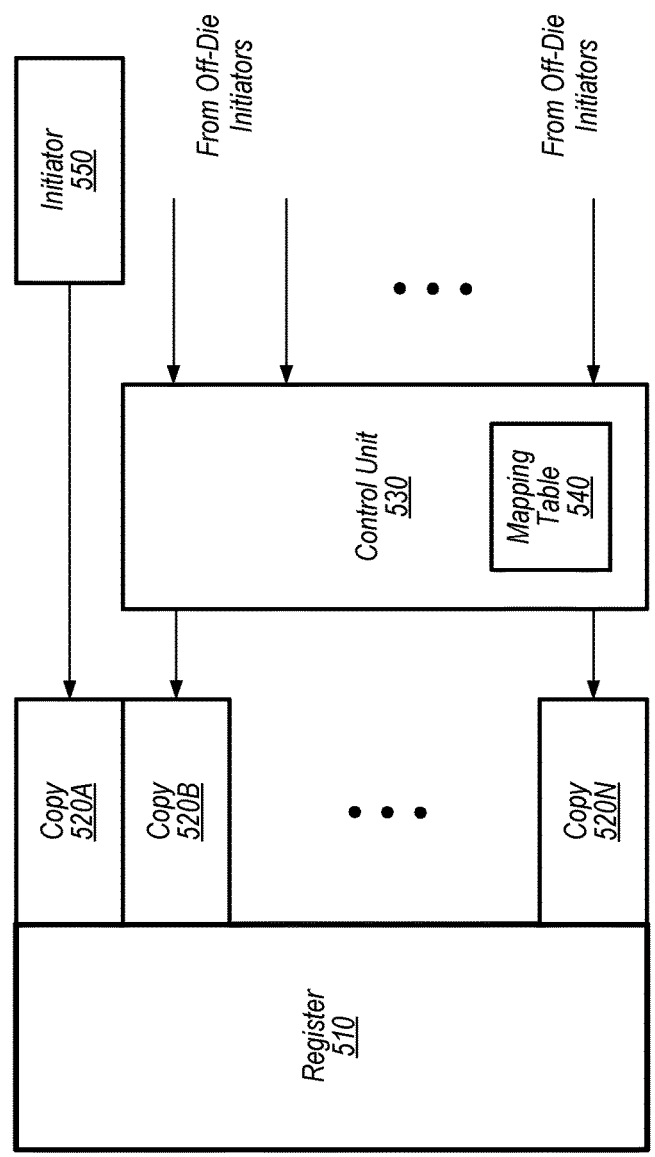
FIG. 5 is a block diagram of one implementation of a master die.

Referring now to FIG. 5, a block diagram of one implementation of a master die 500 is shown. It is noted that master die 500 can be part of a chiplet GPU (e.g., chiplet GPU 440 of FIG. 4) with any number of other semiconductor dies. Control unit 530 handles the accesses to copies 520B-N of register 510 by off-die initiators (not shown). The copies 520A-N of register 510 allow each separate die to access a separate copy of register 510. This also allows the initiators on the various dies to use the same address to target register 510 without interfering with initiators from other dies.

In one implementation, initiator 550 is hard-wired to access copy 520A of register 510 without intervention by control unit 530. In other implementations, control unit 530 routes accesses by initiator 550 to copy 520A. It is assumed for the purposes of this discussion that initiator 550 is located on the same master die as control unit 530. In one implementation, control unit 530 includes mapping table 540 for mapping off-die initiators to copies 520B-N. In this implementation, control unit 530 retrieves a die ID or other identifying characteristic from a register access to use as an index into mapping table 540. In other implementations, control unit 530 uses other techniques to map off-die initiators to copies 520B-N.

Figure 6:
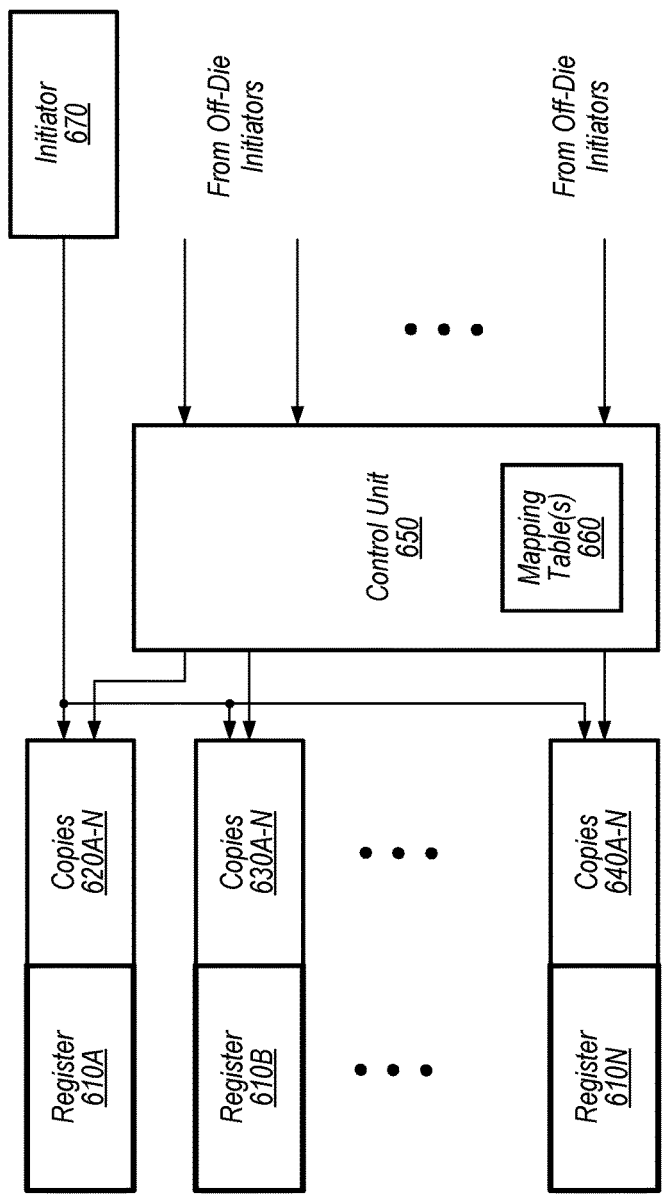
FIG. 6 is a block diagram of one implementation of a control unit on a master die.

Turning now to FIG. 6, a block diagram of one implementation of a control unit 650 on a master die 600 is shown. While previous examples of master dies had shown a single register with multiple copies, master die 600 includes multiple registers 610A-N, with each register having its own set of copies for the different initiators on the other secondary dies (not shown) of a chiplet GPU (e.g., chiplet GPU 440 of FIG. 4). In one implementation, master die 600 includes initiator 670 which is coupled directly to a given copy in copies 620A-N, 630A-N, and 640A-N. In another implementation, initiator 670 is coupled to control unit 650 which routes accesses to the appropriate copy of copies 620A-N, 630A-N, and 640A-N. Initiator 670 is representative of any number and type of initiators. I For example, copies 620A-N are maintained for register 610A to be accessed by initiators from other dies, copies 630A-N are maintained for register 610B to be accessed by initiators from other dies, and copies 640A-N are maintained for register 610N to be accessed by initiators on other dies. The number of copies can be based on the number of different semiconductor die, in one implementation. In other implementations, the number of copies can vary, such as by having two copies per die, three copies per die, or otherwise. In these implementations, different initiators on the die can have their own copy separate from other initiators on the same die. Control unit 650 maintains mapping table(s) 660 to map the different initiators on the other dies to copies 620A-N, 630A-N, and 640A-N. In one implementation, there is a separate mapping table 660 for each separate register 610A-N.

Figure 7:
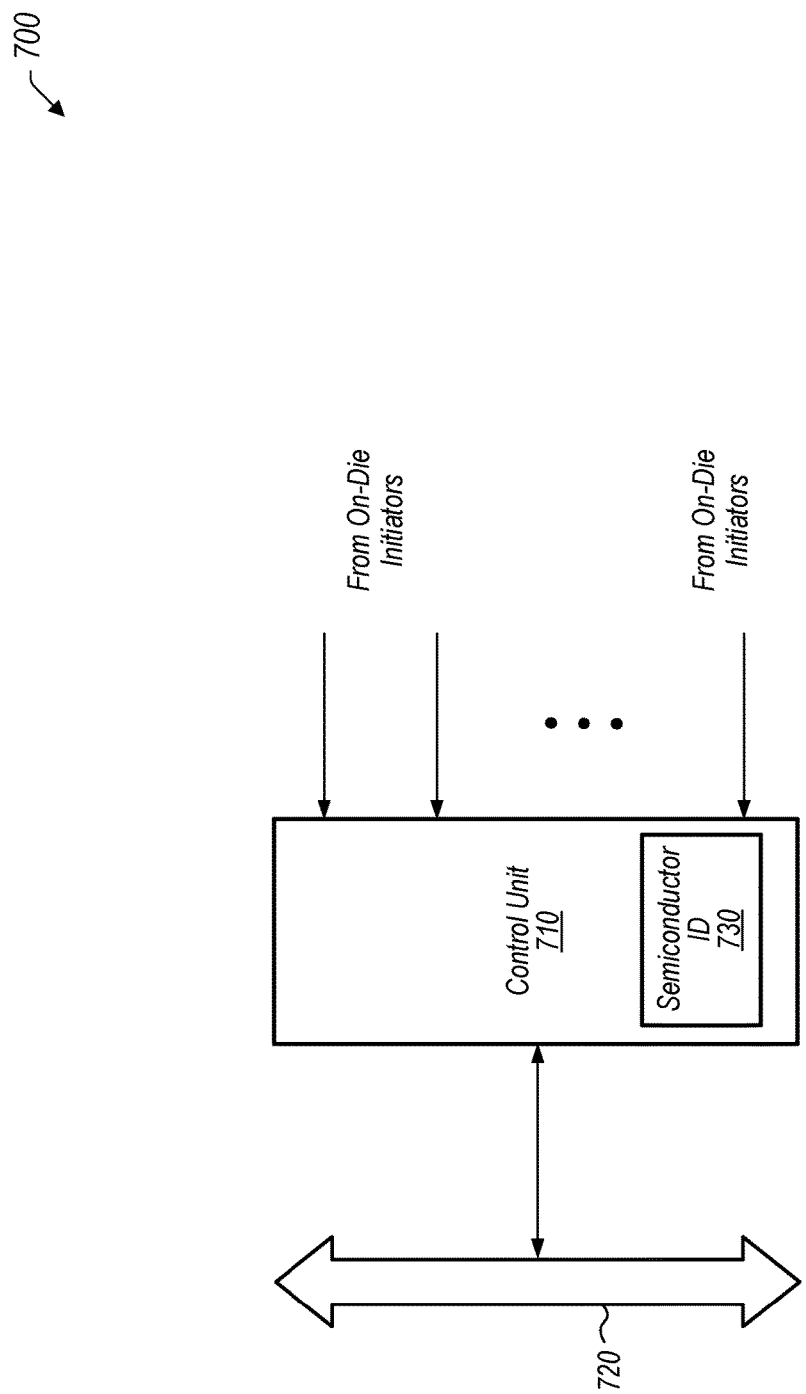
FIG. 7 is a block diagram of one implementation of a secondary die.

Referring now to FIG. 7, a block diagram of one implementation of a secondary die 700 is shown. In one implementation, secondary die 700 is part of a multi-die chiplet processor (e.g., chiplet GPU 440 of FIG. 4). As shown, secondary die 700 includes control unit 710 which is coupled to communication link 720. Communication link 720 represents a link, bus, or other communication channel for connecting the multiple dies of the chiplet to each other. When control unit 710 detects a register access by one of the on-die initiators (not shown), control unit 710 tags the register access with semiconductor ID 730 and forwards the register access to the master die (not shown) via communication link 720. Control unit 710 can be implemented using any suitable combination of circuitry, processing elements, and/or executable program instructions. By tagging the register access with the semiconductor ID 730, the register access can be performed, by the master die, to the appropriate copy of the targeted register. This allows secondary die 700 to operate as if it has exclusive access to the targeted register.

Turning now to FIG. 8, a diagram of one implementation of a register copy mapping table 800 is shown. In one implementation, the entries of table 800 are included in table 540 (of FIG. 5). In one implementation, the entries of table 800 include two fields: initiator ID field 810 and register copy ID field 820. Any number of entries can be included in table 800, with entries shown for initiator IDs "001" and "111" and register copies 520B and 520N, respectively. In other implementations, the entries of table 800 can include other numbers and/or types of fields and can be structured in other suitable manners. It should be understood that initiator ID field 810 having three bits is merely indicative of one implementation. Initiator ID field 810 and register copy field 820 can be encoded with any numbers of bits, with the number varying according to the implementation. It is noted that initiator ID field 810 can also be referred to as semiconductor die ID field 810, with the semiconductor die ID serving as the initiator ID in one particular implementation. In one implementation, when a control unit (e.g., control unit 530) receives a register access from an initiator, the control unit performs a lookup of table 800 with the initiator ID to determine which register copy to access. The control unit then accesses the identified register copy on behalf of the initiator.

Figure 10:
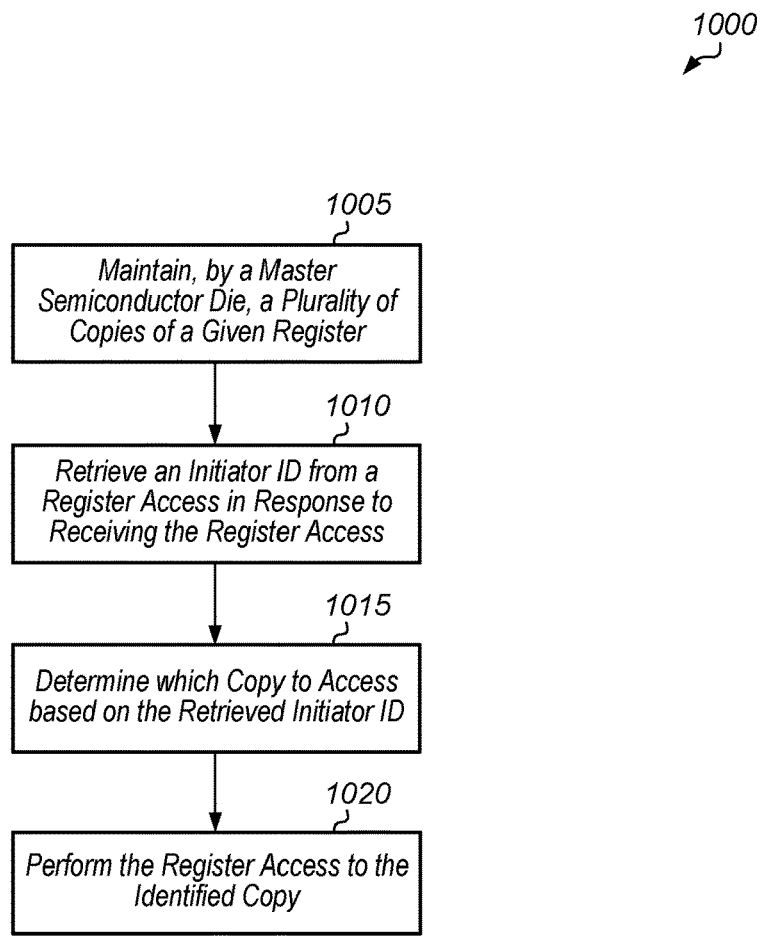
FIG. 10 is a generalized flow diagram illustrating one implementation of a method for maintaining multiple copies of a register for initiators from multiple semiconductor dies.
Figure 11:
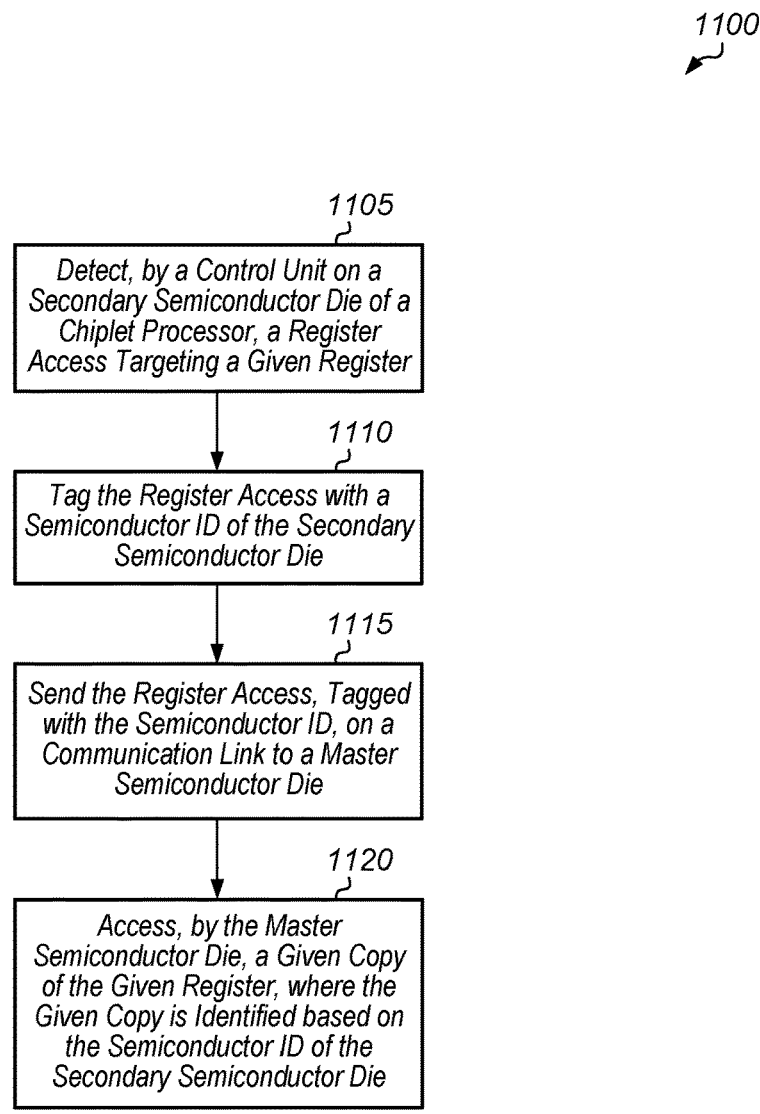
FIG. 11 is a generalized flow diagram illustrating one implementation of a method for tagging register accesses with semiconductor IDs.

Turning now to FIG. 9, one implementation of a method 900 for determining which copy of a register to access based on an initiator index is shown. For purposes of discussion, the steps in this implementation and those of FIG. 10-11 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 900 (and methods 1000-1100).

A control unit (e.g., control unit 530 of FIG. 5) on a master semiconductor die of a multi-die chiplet processor receives, from a given initiator, a register access targeting a given register (block 905). The control unit retrieves an initiator ID from the register access (block 910). Next, the control unit identifies a copy of the given register to access based on the retrieved initiator ID (block 915). Then, the control unit performs an access to the identified copy of the given register (block 920). After block 920, method 900 ends. Alternatively, after block 920, the multi-die chiplet processor performs one or more actions as a result of the access to the given register (optional block 925). For example, in one implementation, the given register is a flush register, and the control unit or other agent on the master die causes memory requests targeting a memory subsystem to be flushed as a result of a write to the flush register. In other implementations, other types of actions can be taken as a result of the access to the given register.

Turning now to FIG. 10, one implementation of a method 1000 for maintaining multiple copies of a register for initiators from multiple semiconductor dies is shown. A master semiconductor die maintains a plurality of copies of a given register (block 1005). When the master semiconductor die receives a register access targeting the given register, the master semiconductor die retrieves an initiator ID from the register access (block 1010). Next, the master semiconductor die determines which copy to access based on the retrieved initiator ID (block 1015). Then, the master semiconductor die performs the register access to the identified copy (block 1020). After block 1020, method 1000 ends.

Referring now to FIG. 11, one implementation of a method 1100 for tagging register accesses with semiconductor IDs is shown. A control unit (e.g., control unit 710 of FIG. 7) on a secondary semiconductor die, of a chiplet processor (e.g., chiplet GPU 340 of FIG. 3), detects a register access targeting a given register (block 1105). The control unit tags the register access with a semiconductor ID of the secondary semiconductor die (block 1110). In another implementation, the control unit tags the register access with an initiator ID of the initiator which generated the register access. Next, the control unit sends the register access, tagged with the semiconductor ID, on a communication link to a master semiconductor die (block 1115). Then, the master semiconductor die accesses a given copy of the given register, where the given copy is identified based on the semiconductor ID of the secondary semiconductor die (block 1120). After block 1120, method 1100 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
    an interface comprising circuitry configured to communicate with one or more semiconductor dies via a communication link; and
    a first control unit comprising circuitry configured to:
        receive, via the interface, a register access that targets a register;
        perform the register access to a first copy of the register responsive to a determination that a first initiator generated the register access; and
        perform the register access to a second copy of the register, different from the first copy, responsive to a determination that a second initiator generated the register access.

2. The apparatus as recited in claim 1, wherein the first control unit is further configured to determine which copy of the register to access based on an identifier (ID) received with the register access.

3. The apparatus as recited in claim 2, wherein the ID is a semiconductor die ID.

4. The apparatus as recited in claim 2, wherein the ID was added to the access request by a semiconductor die that generated the register access.

5. The apparatus as recited in claim 4, wherein the first control unit is configured to determine which of the first initiator and the second initiator generated the access request based on the ID.

6. The apparatus as recited in claim 1, wherein the control unit is further configured to cause outstanding memory requests to a memory subsystem to be flushed responsive to performing the register access.

7. The apparatus as recited in claim 1, wherein the first control unit is further configured to maintain a plurality of copies of the register, wherein each copy corresponds to a separate semiconductor die.

8. A method comprising:
    receiving, by circuitry of a control unit, a register access directed to a targeted register;
    performing the register access to a first copy of the register responsive to determining a first initiator generated the register access; and
    performing the register access to a second copy of the register responsive to determining a second initiator generated the register access, wherein the second copy is different from the first copy.

9. The method as recited in claim 8, further comprising determining which copy of the register to access based on a given identifier (ID) conveyed with the register access.

10. The method as recited in claim 9, wherein the given ID is a semiconductor die ID.

11. The method as recited in claim 8, further comprising adding, by a second control unit on a second semiconductor die, an identifier (ID) of the second semiconductor ID to the register access generated by the second initiator prior to conveying the register access on a communication link to a first semiconductor die.

12. The method as recited in claim 8, wherein a first access request includes a first identifier (ID) identifying the first initiator, wherein a second access request includes a second ID identifying the second initiator, and wherein the method further comprising differentiating between the first access request and the second access request based on the first and second IDs.

13. The method as recited in claim 8, further comprising causing outstanding memory requests to a memory subsystem to be flushed responsive to performing the register access.

14. The method as recited in claim 8, further comprising maintaining a plurality of copies of the targeted register, wherein each copy corresponds to a separate semiconductor die.

15. A system comprising:
    a plurality of semiconductor dies;
    a memory subsystem; and
    a first control unit comprising circuitry in a first semiconductor die of the plurality of semiconductor dies configured to:
        receive a register access directed to a targeted register;
        perform the register access to a first copy of the register responsive to determining a first initiator generated the register access; and
        perform the register access to a second copy of the register responsive to determining a second initiator generated the register access, wherein the second copy is different from the first copy.

16. The system as recited in claim 15, wherein the first control unit is further configured to determine which copy of the register to access based on a given identifier (ID) conveyed with the register access.

17. The system as recited in claim 16, wherein the given ID is a semiconductor die ID.

18. The system as recited in claim 15, further comprising a second control unit on a second semiconductor die, wherein the second control unit is configured to add an identifier (ID) of the second semiconductor to the register access generated by the second initiator prior to conveying the register access on a communication link to the first semiconductor die.

19. The system as recited in claim 15, wherein a first access request includes a first identifier (ID) identifying the first initiator, wherein a second access request includes a second ID identifying the second initiator, and wherein the first control unit is configured to differentiate between the first access request and the second access requests based on the first and second IDs.

20. The system as recited in claim 15, wherein the first control unit is further configured to cause outstanding memory requests to the memory subsystem to be flushed responsive to performing the register access.

\* \* \* \* \*